Nov. 14, 1950  R. L. WALLACE, JR  2,530,105
METHOD OF MAKING A DIVER'S COMBINED HOSE AND
ELECTRICAL COMMUNICATION LINE CABLE
Filed Dec. 17, 1945

INVENTOR
Robert L. Wallace Jr.
BY ATTORNEY
William D. Hall

Patented Nov. 14, 1950

2,530,105

UNITED STATES PATENT OFFICE 2,530,105

METHOD OF MAKING A DIVER'S COMBINED HOSE AND ELECTRICAL COMMUNICATION LINE CABLE

Robert Lee Wallace, Jr., Coolidge, Tex., assignor to the United States of America as represented by the Office of Scientific Research and Development Application December 17, 1945, Serial No. 635,582

1 Claim. (Cl. 154—2.27)

This invention relates to cables. More particularly the invention deals with a cable for use under water in connection with diving helmets and similar equipment.

In designing communication equipment for use in diving headgear, it has been customary to resort to a number of separately arranged electrical cables and air hose extending between the surface and the diver's equipment. It is possible for these elements to become entangled during use, with the immediate danger that the air hose may be cut off and other serious difficulties encountered.

An object of the invention, therefore, is to provide improved diving equipment and to combine electrical cables with an air hose element in a single line with a view to avoiding the difficulties noted.

To this end I have discovered a novel dual purpose cable having electrical conductors combined with an air hose in a compact manner so that the air hose cannot be cut off under operating conditions. An important feature of the invention is the arrangement of a plurality of helically wound electrical conductors between an air hose and a protecting sheath with the conducting elements occurring in spaced apart relation. Another feature of the invention is a method of combining the two tubular members with the electrical conductors in a tight, well-sealed, state to resist penetration by water. Other features of the invention will appear in the following description.

Figure 1:
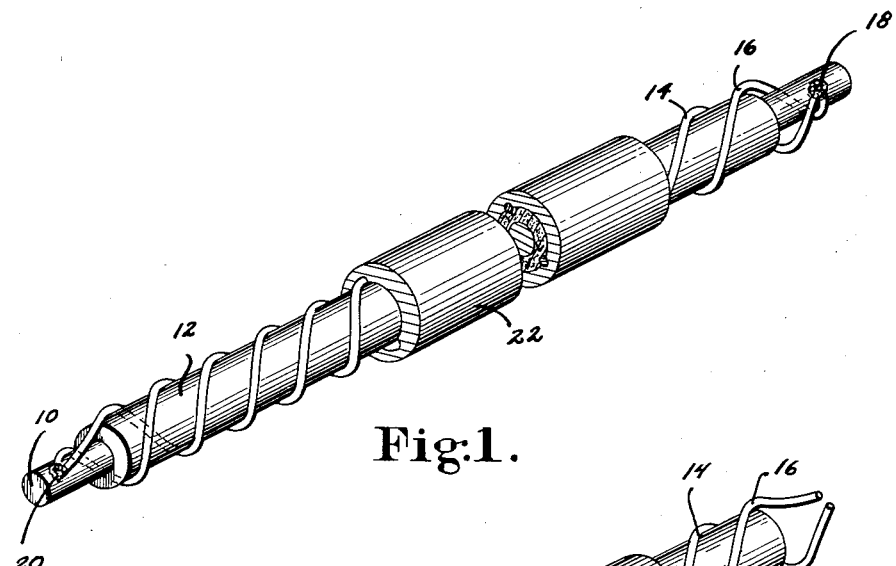
Fig. 1 is a perspective view of the dual purpose cable of the invention illustrating a step in assembling electrical conductors.

Referring more in detail to the drawings, numeral 10 denotes a steel rod of some suitable diameter which may, for example, have a diameter of slightly less than ⅛ of an inch. The rod 10 is to serve as a mandrel and may be of a length corresponding to a length of cabling which is desired to be made. Over the rod 10 is slipped a rubber tubing element 12 which may consist of neoprene. The tubing has an inner diameter of approximately ⅛ of an inch which allows it to fit around and slip easily along over the steel rod described. Thereafter two wires 14 and 16 are secured together and to one end of the rod 10 beyond one end of the tube 12 in some suitable manner, as by soldering 18, with the two wires diverging from the point of soldering as noted in the drawings. The wires are then helically wound in spaced relation around the neoprene tubing 12 with an appreciable tension which causes the wire members to sink into the rubber tubing to a slight degree and also to compress the tubing, slightly reducing its outer diameter. The extremities of the wires, still under tension, are then fastened to the steel rod 10 at a second point of soldering 20 beyond the completed winding, as noted.

Figure 2:
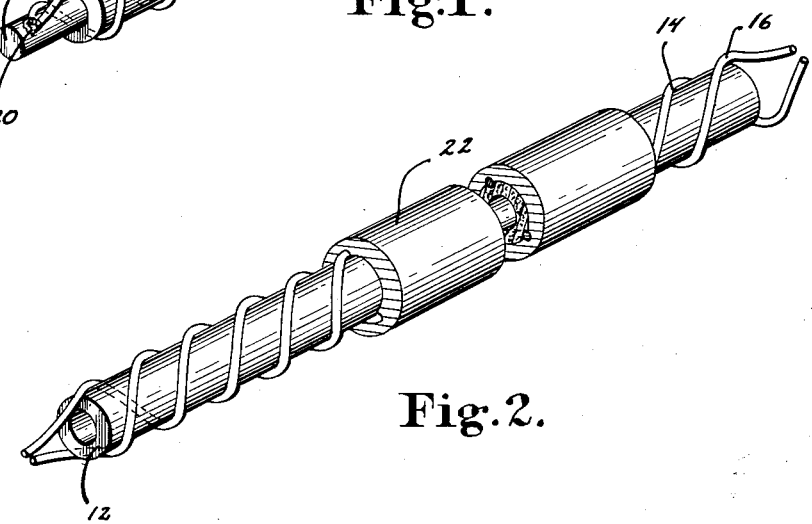
Fig. 2 is another perspective view of the finished cable with the central portion being broken away and with the electrical conductors in an operative position.

While the tube 12 is thus held in a slightly compressed condition, a coating of rubber cement is applied. A second tubing, constituting an outer sheath 22, is then coated exteriorly with neoprene cement and slipped over the first named tubing element and wires so as to surround and inclose them concentrically with the tube 12. The inner diameter of the sheath 22 may be slightly larger than the compressed tube 12 so as to facilitate this operation. A sheath diameter of ¼ inch is suitable, for example. Thereafter the wires are disengaged from the points of soldering 18 and 20. This releases the tubular element 12, permitting it to expand slightly by recovery from compression, due to its inherent elasticity, and thus exert pressure against the outer sheath 22, embedding the wires to some extent in the material of the sheath, as appears in Figs. 1 and 2. As a result, the material of both tubes is thus indented by the wires, so that by the furrow-like indents in the tubes, together with the cement filling, the wires are snugly inclosed and held in spaced relation. The cable member is then subjected to a heat treatment such as for example exposure for thirty minutes at temperatures of 300° F., thus setting the neoprene cement to form a secure bond. This may be termed vulcanization.

The tubing may then be employed to perform two functions, especially desirable in the use of shallow water diving equipment. It provides an electrical connection between a microphone mounted in the facepiece or mask of the diving helmet, headphones mounted in the diving dress, and the communications cable from the diver to the tender. The opening in the inner tubular member 12 may be utilized to apply to the diver's ears the same air pressure that existed in the facepiece. This equalization of air pressure on the ears is helpful in preventing pain in the worker's ears. Various other applications of the dual purpose cable may be resorted to.

The arrangement described provides a compact unit which is not easily entangled and which is not subject to accidental closure of the air passage. The method of assembly serves as a novel means of providing for internal pressure which assists in forming a tightly-bonded relation of one tubular member within the other. It is intended that various other types of materials and electrical conductors may be combined in the manner described.

Having thus described my invention, what I claim is:

Method of making a combined hose and electrical communications cable comprising the steps: placing an inner tube of indentable elastic insulating material slidably on a mandrel, winding spirally thereon throughout the length of the mandrel at least one metallic conductor wire, applying to the wire during said winding and thereafter a longitudinal tension sufficient to compress the tube to a materially smaller diameter and to embed the said wire at least partially in the tube by deformation of the tube within is elastic limit, thereafter while maintaining said tension applying a rubber-like cement over the tube and wound wire, and while still maintaining said tension, sliding longitudinally and coaxially on to the said tube and the wire so wound thereon a preformed outer tube of indentable elastic material coextensive in length with the inner tube, after so positioning said outer tube releasing the said spirally wound wire from said longitudinal tension to free the same and said inner tube, and permitting the inner tube and spirally wound wire to expand radially with respect to the said outer tube into engagement with the material of the said outer tube by inherent capability of recovery from deformation produced in the winding of said wire under said longitudinal tension and so as to embed the wire at least partially in the outer tube, and removing the article thus formed from said mandrel.

ROBERT LEE WALLACE, Jr.

REFERENCES CITED

The following references are of record in the file of this patent:

UNITED STATES PATENTS

| Number | Name | Date |
|---|---|---|
| 59,318 | Phelps | Oct. 30, 1866 |
| 202,047 | Phillips | Apr. 2, 1878 |
| 305,475 | Reed | Sept. 23, 1884 |
| 309,244 | Paterson | Dec. 16, 1884 |
| 2,157,580 | Voit et al. | May 9, 1939 |
| 2,320,367 | Leathers | June 1, 1943 |
| 2,320,470 | Rees | June 1, 1943 |
| 2,389,705 | Wetzel | Nov. 27, 1945 |
| 2,455,349 | Baymiller | Dec. 7, 1948 |